Aug. 24, 1937.  H. A. WILSON  2,090,713
GRAVITY MEASURING DEVICE
Filed Aug. 17, 1935  6 Sheets—Sheet 1

Fig.—1

Harold A. Wilson Inventor
By P. L. Young Attorney

Aug. 24, 1937.  H. A. WILSON  2,090,713
GRAVITY MEASURING DEVICE
Filed Aug. 17, 1935  6 Sheets—Sheet 3

Harold A. Wilson Inventor
By P. L. Young Attorney

Aug. 24, 1937.    H. A. WILSON    2,090,713
GRAVITY MEASURING DEVICE
Filed Aug. 17, 1935    6 Sheets—Sheet 6

Harold A. Wilson Inventor
By P. L. Young Attorney

Patented Aug. 24, 1937

2,090,713

UNITED STATES PATENT OFFICE 2,090,713

GRAVITY MEASURING DEVICE

Harold A. Wilson, Houston, Tex., assignor to Standard Oil Development Company, a corporation of Delaware Application August 17, 1935, Serial No. 36,656

24 Claims. (Cl. 265—1.4)

This invention relates to an improved apparatus for comparing the values of gravitational acceleration by plurality of stations.

In gravitational prospecting by means of pendulums it has been customary up to the present time to use one of two methods. In one method one pendulum is placed at a base station and another pendulum is placed at a field station. The beats of the field pendulum are transmitted to the base station and coincidences are observed between the beats of the two pendulums. In operating according to the other method the pendulum frequencies are multiplied to radio frequencies, say to about one million cycles; the approximately million cycle multiplied frequency of the field pendulum is then transmitted to the base station and coincidences are observed with the similarly multiplied frequency of the base pendulum.

It is an object of the present invention to provide an improved apparatus for the multiplication of the frequency of a pendulum and for the accurate and reliable determination of the differences of the accelerations due to gravity by the observation of the frequencies of one or more pendulums.

Other objects will be apparent from the specification and from the accompanying drawings, in which latter—

Fig. 8 is a diagrammatic representation of an arrangement for effecting the rotation of the screen through proper vertical and/or horizontal angles when the eccentricity of the ellipse traced by the path of light on the screen is large.

Figure 1:
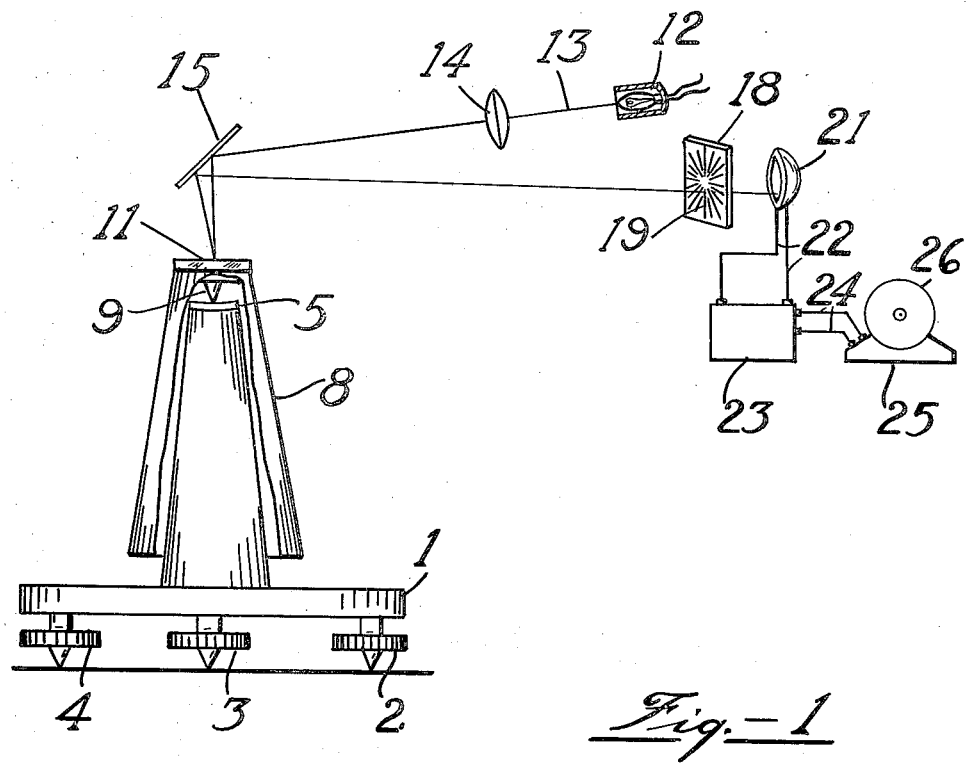
Fig. 1 is a diagrammatic representation of a preferred form of apparatus for multiplying the frequency of a pendulum in which the pendulum is mounted for rotation about a vertical axis and directs a beam of light in a curved path approximately circular or elliptical.

Referring particularly to Fig. 1 of the drawings, a pendulum device is illustrated comprising a base 1 supported by levelling screws 2, 3 and 4. The base carries a pendulum plate 5. A conical pendulum 8 is supported by the pendulum plate 5 through a point support 9 which rests upon the plate 5. The top of the conical pendulum 8 is fitted with a mirror 11. The conical pendulum 8 is adapted to be set in motion so that its center of gravity describes a curve in a horizontal plane. The time required for a complete revolution of the pendulum is determined by the dimensions of the pendulum, the size of the curved path, and the value of the gravitational acceleration at the location where the pendulum is being operated.

Means are provided for reflecting a beam of light from the mirror 11 on the top of the pendulum 8 in a curved path approximately circular or elliptical. The means comprises a source 12 of a beam of light which directs the beam of light along the path 13 through a lens 14 by means of which the light beam is collimated. The light beam is reflected from a stationary mirror 15 to the mirror 11, back to the mirror 15 and thence to a scanning disc 18. The scanning disc 18 comprises a screen having radial slits 19. The beam of light follows a curved path on the screen 18 due to the motion of the pendulum 8. Thus, an optical path is designed so that a point of light traces a curved path on the screen 18 in synchronism with the rotation of the pendulum 8.

The path of the beam of light beyond the screen 18 is broken into increments by means of the screen since the light is transmitted only through the slits 19. Successive pulsations of electric energy are created corresponding to the increments, as follows. The light transmitted through slits 19 is directed upon a photo-electric cell 21 whereby periodic light impulses are given to the photo-electric cell. Current from the cell 21 is conducted through lines 22 to an amplifier 23 and the amplified current is conducted through lines 24 to a synchronous motor 25. The synchronous motor 25 is operatively connected to drive a disc 26 which indicates the speed of the motor 25. The use of a plurality of slits in the screen 18 permits of the creation of an equal number of pulsations of electric energy per revolution of the pendulum and consequently provides for indicating a multiplication of the frequency of the pendulum. It will be understood that any desired number of impulses per pendulum revolution can be transmitted through the photo-electric cell to the motor 25. Thus an accurate frequency multiplication of many fold can be obtained.

Figure 2:
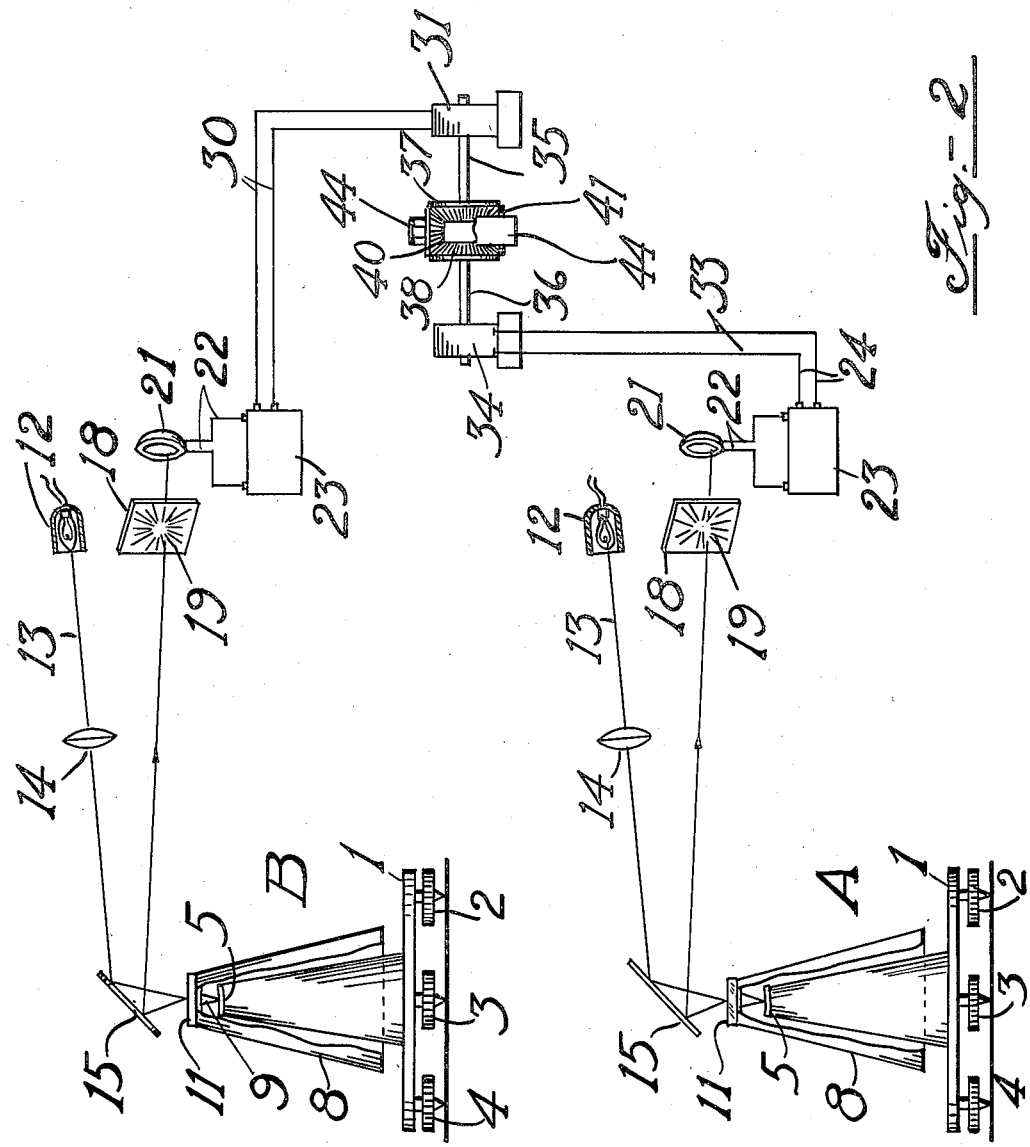
Fig. 2 is a diagrammatic representation of a preferred form of apparatus showing the pendulum apparatus of Fig. 1 disposed at different stations and means for comparing the multiplied frequencies of the pendulums.

Referring particularly to Fig. 2, the pendulum system of Fig. 1 is shown disposed at both a base station and a field station with a preferred arrangement for comparing the multiplied frequencies of the pendulums. The pendulum systems are used to compare the acceleration of gravity at two locations. Since the pendulum arrangements at both the base and field stations are identical with that illustrated in Fig. 1, like reference numerals have been applied to like parts in these figures. Means are provided for comparing the frequencies of the pulsations of each pendulum system. In the preferred arrangement, the impulses from the photo-electric cell 21 of the field station are transmitted by conductor or radio to the base station. For example, assuming the pendulum A in Fig. 2 to be disposed at a base station and the pendulum B to be disposed at a field station, the conductors 30 leading from the amplifier 23 at the field station conduct the pulsations of electric energy to the synchronous motor 31 disposed at the base station. Conductors 33 lead from the amplifier 23 of the base station to a synchronous motor 34. The synchronous motors 31 and 34 drive aligned shafts 35 and 36 respectively. The shafts 35 and 36 carry differential gears 37 and 38 respectively. Differential gear 37 is driven by the motor 31 in one direction. The differential gear 38 is driven by the motor 34 in the opposite direction. Floating gears 40 and 41 are operatively associated with the differential gears 37 and 38 and are seated by a housing 44 which latter is caused to be rotated by the differential gear system with a period equal to half the difference in the periods of rotation of the synchronous motors 31 and 34. The period of rotation of the housing 44 is, therefore, proportional to the frequency difference of the pulsations of each pendulum system. Thus, the periods of the two motors 31 and 34 are compared.

Figure 3:
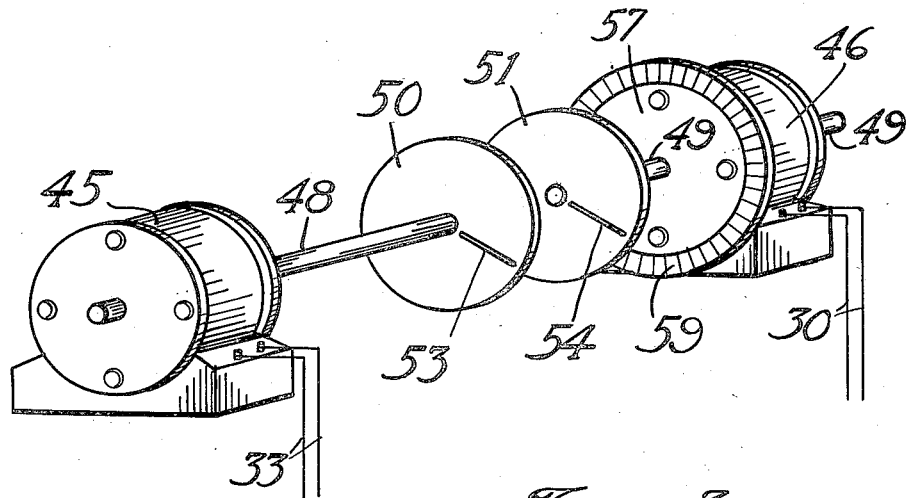
Fig. 3 is a perspective view of a modified form of apparatus for comparing the multiplied frequencies of the pendulums.

Referring particularly to Fig. 3, an alternative arrangement is illustrated for comparing the periods of the synchronous motors operatively connected with pendulum systems disposed at base and field stations respectively for comparing the frequencies of the pulsations generated at the base and field stations. In this figure reference numeral 45 designates a synchronous motor connected with the pendulum system at the base station, and reference numeral 46 designates a synchronous motor connected with the pendulum system at the field station. The motors 45 and 46 drive aligned coaxial shafts 48 and 49 respectively. The adjoining ends of the shafts 48 and 49 carry discs 50 and 51 respectively. If these discs are marked in any suitable way and are caused to be revolved in the same direction by the synchronous motors, the marks will come into coincidence periodically with a period which is the difference between the periods of the synchronous motors. In the embodiment illustrated the disc 50 is provided with a narrow radial slit 53. The disc 51 is provided with a narrow radial slit 54. A stationary graduated disc 57 is disposed on one side of the discs 50 and 51. During rotation of the discs 50 and 51 in the same direction a beam of light from a source (not shown) on the opposite side of the discs 50 and 51 passes through the discs 50 and 51 only when the slits 53 and 54 coincide. At this time the illustrated stationary disc 57 will be visible through the slits 53 and 54. The position of slit coincidence can be noted by means of an angular scale 59 carried by the stationary disc 21. Alternatively, the eye of the observer can be disposed opposite the discs 50 and 51 to observe on a scale 59 the point at which the scale is visible upon coincidence of the slits 53 and 54. The time between two successive coincidences of the slits 53 and 54 gives the difference in the periods of the two motors.

Figure 4:
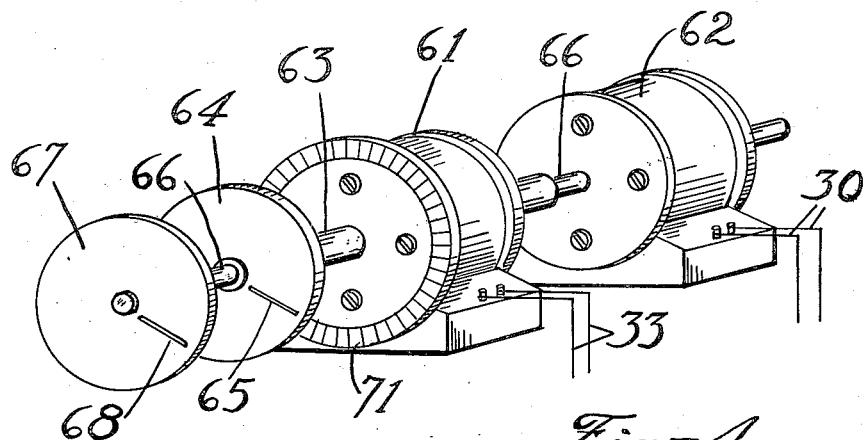
Fig. 4 is a perspective view of still another modified form of apparatus for comparing the multiplied frequencies of the two pendulums.

Referring to Fig. 4, still another arrangement is shown whereby the frequencies of the pulsations of the pendulum systems at base and field stations can be compared. In this embodiment, a synchronous motor 61 is adapted to be operatively connected with one of the pendulum systems, for example the one at the base station, and the synchronous motor 62 is adapted to be connected with the other pendulum system. The synchronous motor 61 is provided with a tubular drive-shaft 63 which extends through the motor and carries a disc 64 having a radially disposed slit 65. The synchronous motor 62 is provided with a drive-shaft 66 which extends through and protrudes from the tubular shaft 63. The protruding end of the shaft 66 drives a disc 67 which is provided with a radially disposed slit 68. The discs 64 and 67 are driven in rotation in the same direction and the slits 65 and 68 come into coincidence periodically with a period which is the difference between the periods of the motors 61 and 62. Any suitable way for reading the coincidences can be provided, such as those described in connection with Fig. 3.

Figure 5:
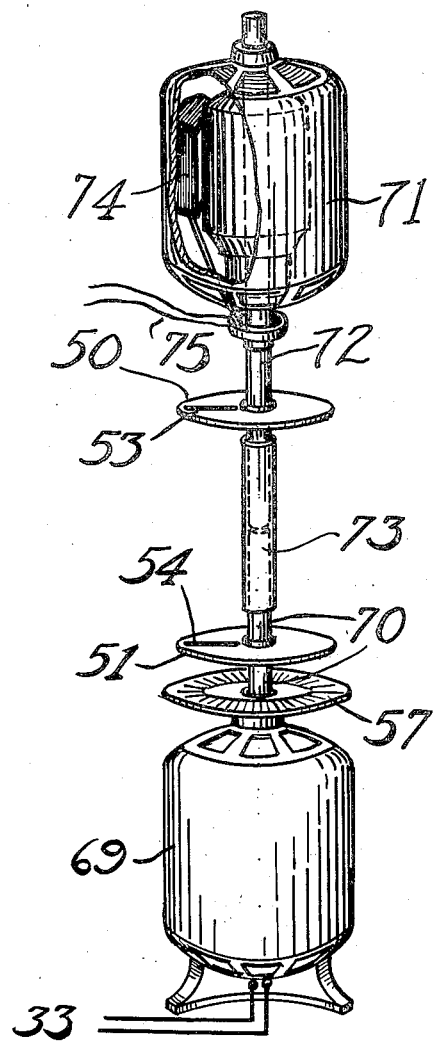
Fig. 5 is a perspective view of another modified form of apparatus for comparing the multiplied frequencies of the two pendulums.

Referring to Fig. 5, a further arrangement is shown whereby the frequencies of the pulsations of the pendulum systems at base and field stations can be compared. In this embodiment, the synchronous motor 69 is mounted on a base with its drive-shaft 70 vertical. The synchronous motor 69 is adapted to be operatively connected with one of the pendulum systems, for example the one at the base station, and a synchronous motor 71, adapted to be connected with the other pendulum system, is provided with an armature and drive-shaft 72. The armature and drive-shaft 72 is connected with the drive-shaft 70 by means of a suitable collar 73 whereby the motor 71 is supported by the motor 69. The motor 71 is provided with magnets 74 which are free to turn around the armature and shaft 72. The current is let into the motor 71 through flexible leads 75. Alternatively, the current can be let into the motor 71 by means of circular mercury troughs, not shown. The motor 71 is thus caused to rotate with a period which is equal to the frequency difference of the pulsations of each pendulum system.

The procedure above described for comparing periodic motions can be applied to types other than a pendulum having a nearly circular or elliptical motion. If two ordinary pendulums are swung with their planes of pulsations at right angles to each other, a beam can be made to trace a nearly circular or elliptic path which is a composite of the two oscillatory motions. This beam of light falling on a scanning disc can be utilized similarly to the beam of light from the rotary pendulum as previously described.

Figure 6:
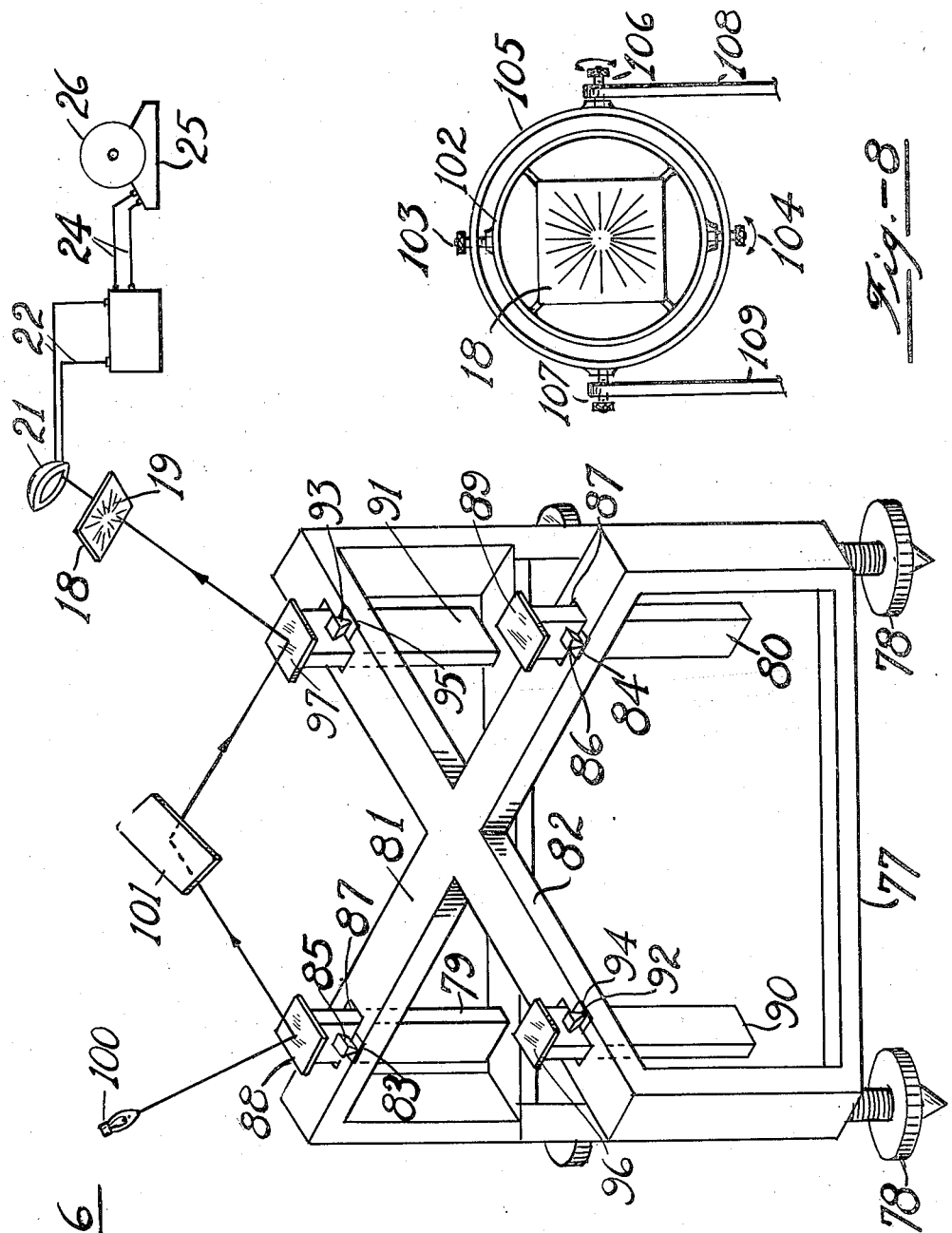
Fig. 6 is a diagrammatic view of an apparatus for obtaining a multiplication of the frequency of a pendulum arrangement showing in perspective a modified form of pendulum arrangement, operative to direct a beam of light in a curved path approximately circular or elliptical.

Referring to Fig. 6, a suitable pendulum system is shown embodying this principle and for use at either base or field station. The device comprises a base frame 77 resting upon leveling screws 78. Two similar pendulums 79 and 80 are supported by the base 77 for oscillation in the same vertical plane. In operation the pendulums 79 and 80 are oscillated 180° out of phase, whereby the horizontal component of forces applied to the base 77 by the pendulums 79 and 80 is cancelled out. The pendulums 79 and 80 are mounted in the direction of their swinging and are disposed opposite to each other on the base. In the preferred embodiment, the base 77 is constructed of crossed arms 81 and 82. The arm 81 carries plates 83 and 84 upon which rest the knife edges 85 and 86 of the pendulums 79 and 80 respectively. The pendulums are suspended in suitable slots 87 in the arm 81. Mirrors 88 and 89 are attached to the top of pendulums 79 and 80 respectively.

Another pair of similar pendulums 90 and 91 is mounted for oscillation in a plane perpendicular to the plane in which the pendulums 79 and 80 are oscillated. The pendulums 90 and 91 are supported by the arm 82. The pendulums 90 and 91 are adapted to be oscillated 180° out of phase in the same vertical plane, whereby the horizontal component of the forces applied to the base 77 by these pendulums is cancelled out. The pendulums 90 and 91 are provided with knife edges 92 and 93, respectively, which rest on plates 94 and 95 in the conventional manner. Mirrors 96 and 97 are carried by the tops of the pendulums 90 and 91 respectively.

A beam of light is caused to trace a circular path in synchronism with the oscillations of the pendulums, as follows. The beam of light from a source of light 100 is successively reflected from the mirror 88 to a stationary mirror 101, to the mirror 97 from which it is reflected and traces a curved path upon a screen 18. The screen 18 and the apparatus for transforming the beam of light into pulsations of electric energy for indicating these pulsations to obtain a multiplication of the frequency of the pendulum device is identical with that described in Figs. 1 and 2, and like reference numerals have been applied to like parts. Similarly, the pendulum system illustrated in Fig. 6 can be set up at both base and fields stations and the frequencies of the pulsations of each system compared, as has been described in connection with Figs. 2, 3, 4 and 5.

Calculation shows that due to difference in lengths of the optical paths from the two pendulum mirrors in the device of Fig. 6, the point of light may trace an ellipse on the screen 18 instead of a circle. This has no serious disadvantage if the eccentricity is small. However, if it be found that the eccentricity is too large it is easy to rotate the screen 18 through proper vertical and/or horizontal angles so that the point of light will trace a circle on the screen. A preferred form of apparatus for accomplishing this result is illustrated in Fig. 8. In this figure, the scanning disc 18 is shown mounted in a ring 102 fastened by means of bearings 103 and 104 to a similar ring 105 which is fastened by means of bearings 106 and 107 to rods 108 and 109. The scanning disc can then be rotated out of the plane of the paper around a vertical axis through bearings 103 and 104 and around a horizontal axis through bearings 106 and 107. It is seen that the arrangement shown in Fig. 8 is a Cardan suspension.

Figure 7:
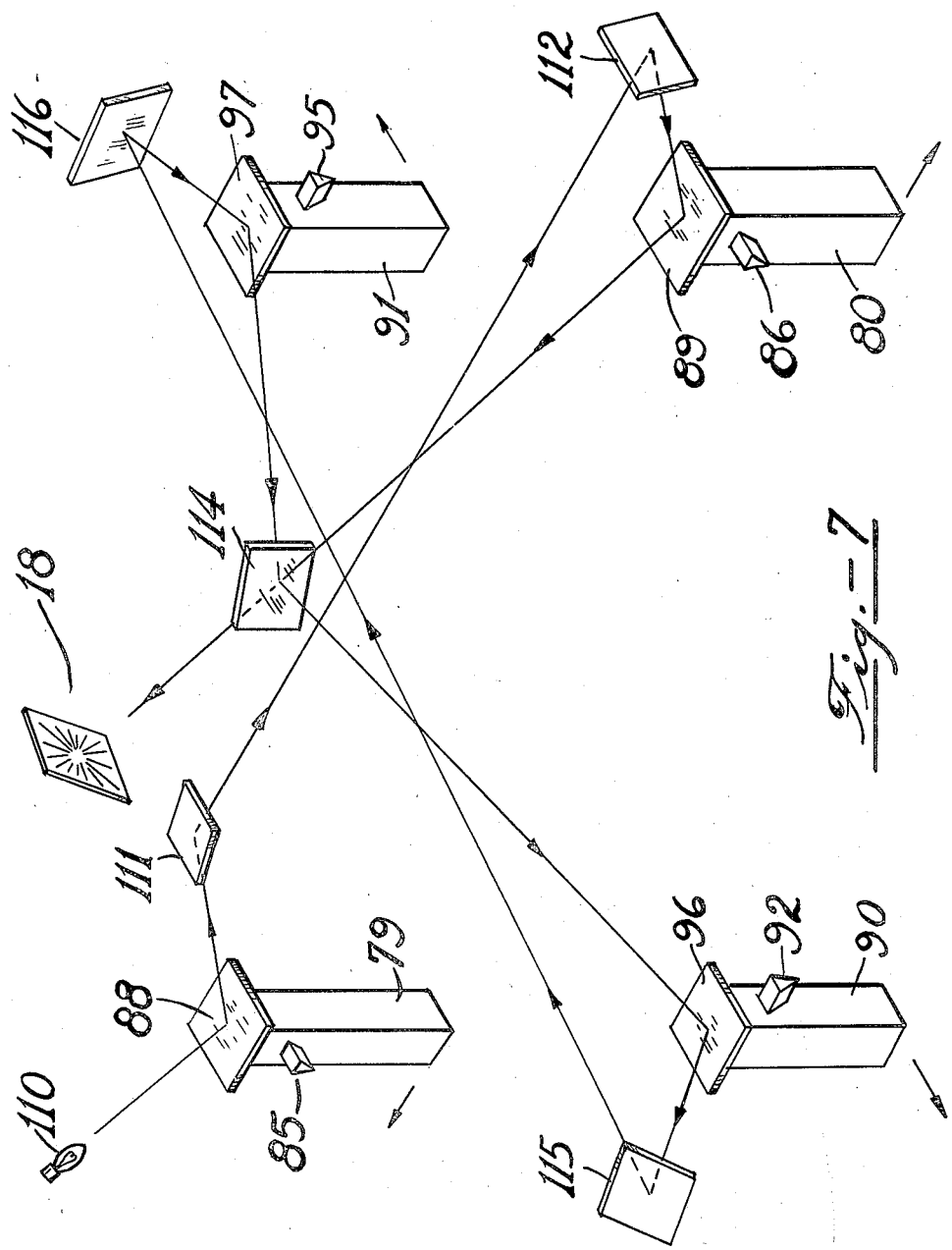
Fig. 7 is a perspective view of still another modified form of pendulum arrangement operative to direct a beam of light in a curved path.

Referring to Fig. 7, an alternative form is illustrated of a multiple pendulum system for use at either a base or field station for directing a beam of light in a curved path approximately circular or elliptical in synchronism with the oscillations of the pendulums. In this system both of the pendulums of each pair of pendulums swinging 180° out of phase contribute to the observation data and thereby the accuracy of the results obtained is increased. The same pendulums have been illustrated in the same positions as in Fig. 6, and like reference numerals have been applied to like parts. A beam of light from a source 110 is reflected in succession from the mirror 88 to a fixed mirror 111, to a fixed mirror 112, to the mirror 89, to a fixed mirror 114 thence to the mirror 96, to a fixed mirror 115 thence to a mirror 116, to the mirror 97, to double-faced mirror 114 from which it is directed in a circular path upon the screen 18, as previously described. As a result of this arrangement the motions of the pendulums 79 and 80 are combined with the motions of the pendulums 90 and 91. Since the mirror 114 is silvered on both surfaces the beam from the mirror is conveniently reflected out of the optical system to the slit screen 18. The beam is caused to pass intermittently through the screen 18 and creates successive pulsations of electric energy, as has been previously described. This pendulum system can be set up at both base and field stations and the frequencies of the pulsations of each system compared as previously described.

Various changes and alternative arrangements may be made within the scope of the appended claims in which it is my intention to claim all novelty inherent in the art as broadly as the prior art permits.

I claim:

1. Apparatus for gravitational prospecting, comprising pendulous means mounted to swing, a source of a beam of light, means for reflecting the beam of light from the pendulous means whereby the beam describes a circular or elliptical path, means for breaking the path of the beam into increments, means for creating successive pulsations of electric energy corresponding to the increments, and means for indicating the pulsations.

2. Apparatus for gravitational prospecting, comprising a pendulum mounted for rotation, a mirror carried by the top of the pendulum, a photo-electric cell, a source of a beam of light, means for reflecting the beam of light from the mirror whereby the beam describes a circular or elliptical path, means for intermittently directing the beam of light upon the cell to actuate the cell to produce pulsations of the electric energy corresponding to a multiple of the frequency of the pendulum, and means for indicating the pulsations.

3. Apparatus for gravitational prospecting, comprising a pendulum mounted for rotation, a mirror carried by the top of the pendulum, a photo-electric cell, a scanning disc having radial slits and disposed between the cell and the mirror, a source of a beam of light, means for deflecting the beam of light from the mirror whereby the beam describes a circular or elliptical path on a scanning disc around the axis of the slits and intermittently shines through the slits to actuate the cell to produce pulsations of electric energy corresponding to a multiple of the frequency of the pendulum, and means for indicating the pulsations.

4. Apparatus for gravitational prospecting, comprising a pendulum mounted for rotation, a mirror carried by the top of the pendulum, a photo-electric cell, a scanning disc having radial slits and disposed between the cell and the mirror, a source of a beam of light, means for deflecting the beam of light from the mirror whereby the beam describes a circular or elliptical path on the scanning disc around the axis of the slits and intermittently shines through the slits to actuate the cell to produce pulsations of electric energy corresponding to a multiple of the frequency of the pendulum, means for amplifying the pulsations, a graduated disc mounted for rotation, and a synchronous motor driven by the amplified pulsations connected to rotate the disc whereby the frequency of the pendulum is indicated by the disc.

5. Apparatus for gravitational prospecting, comprising a pendulum mounted for rotation about a vertical axis, means for creating successive pulsations of electric energy corresponding to equal increments of swing of the pendulum, means for indicating the pulsations comprising a graduated disc mounted for rotation, and a synchronous motor driven by the pulsations connected to rotate the disc whereby the frequency of the pendulum is indicated by the disc.

6. Apparatus for gravitational prospecting, comprising a pendulum system at a base station, a pendulum system at a field station, each system including a pendulum mounted for rotation, a mirror carried by the top of the pendulum, a source of a beam of light, means for deflecting the beam of light from the mirror whereby the beam describes a circular or elliptical path, means for breaking the path of the beam into increments, means for creating successive pulsations of electric energy corresponding to the increments, and means for comparing the frequencies of the pulsations of each system.

7. Apparatus for gravitational prospecting, comprising a pendulum system at a base station, a pendulum system at a field station, each system including a pendulum mounted for rotation about a vertical axis, a mirror carried by the top of the pendulum, a photo-electric cell, a scanning disc having radial slits and disposed between the cell and the mirror, a source of a beam of light, means for deflecting the beam of light from the mirror whereby the beam describes a circular or elliptical path on the scanning disc around the axis of the slits and intermittently shines through the slits to actuate the cell to produce pulsations of electric energy corresponding to a multiple of the frequency of the pendulum, and means for comparing the frequencies of the pulsations of each system.

8. Apparatus for gravitational prospecting, comprising a pendulum system at a base station, a pendulum system at a field station, each system including a pendulum mounted for rotation about a vertical axis and means for creating successive pulsations of electric energy corresponding to increments of swing of the pendulum, means for amplifying the pulsations, synchronous motors, one driven from the pulsations from one pendulum system and the other driven by the pulsations from the other pendulum system, a differential gear driven by one motor in one direction, a differential gear driven by the other motor in the opposite direction, and a floating gear operatively associated with the differential gears whereby the speed of rotation of the floating gear is proportional to the frequency difference of the pulsations of each pendulum system.

9. Apparatus for gravitational prospecting, comprising a pendulum system at a base station, a pendulum system at a field station, each system including a pendulum mounted for rotation about a vertical axis, a mirror carried by the top of the pendulum, a photo-electric cell, a source of a beam of light, means for deflecting the beam of light from the mirror whereby the beam describes a circular or elliptical path, means for intermittently directing the beam of light upon the cell to actuate the cell to produce pulsations of electric energy corresponding to a multiple of the frequency of the pendulum, synchronous motors, one driven by the pulsations of one pendulum system and the other driven by the pulsations from the other pendulum system, a differential gear driven by one motor in one direction, a differential gear driven by the other motor in the opposite direction, and a floating gear operatively associated with the differential gears whereby the speed of rotation of the floating gear is proportional to the frequency difference of the pulsations from each pendulum system.

10. Apparatus for gravitational prospecting, comprising a pendulum system at a base station, a pendulum system at a field station, each system including a pendulum mounted for rotation about a vertical axis and means for creating successive pulsations of electric energy corresponding to increments of swing of the pendulum, synchronous motors, one driven by the pulsations from one system and the other driven by the pulsations from the other system, discs adapted to be driven in rotation in the same direction by the motors and having their axes in alignment, the discs having radially disposed slots, and means for observing the coincidences of the slots whereby variations in the pulsations are observed.

11. Apparatus for gravitational prospecting, comprising pendulums mounted to oscillate about horizontal axes in planes perpendicular to each other, a mirror carried by the top of each pendulum, a source of a beam of light, means for deflecting the beam of light successively from the mirrors whereby the beam describes a circular or elliptical path, means for breaking the path of the beam into increments, means for creating successive pulsations of electric energy corresponding to the increments, and means for indicating the pulsations.

12. Apparatus for gravitational prospecting, comprising pendulums mounted to oscillate about horizontal axes in planes perpendicular to each other, a mirror carried by the top of each pendulum, a photo-electric cell, a source of a beam of light, means for deflecting the beam of light successively from the mirrors whereby the beam describes a circular or elliptical path, means for intermittently directing the beam of light upon the cell to actuate the cell to produce pulsations of electric energy corresponding to a multiple of the composite frequency of the pendulums, and means for indicating the pulsations.

13. Apparatus for gravitational prospecting, comprising pendulums mounted to oscillate about horizontal axes in planes perpendicular to each other, a mirror carried by the top of each pendulum, a photo-electric cell, a scanning disc having radial slits and disposed between the cell and the mirrors, a source of a beam of light, means for deflecting the beam of light successively from the mirrors whereby the beam describes a circular or elliptical path on the scanning disc around the axis of the slits and intermittently shines through the slits to actuate the cell to produce pulsations of electric energy corresponding to a mutiple of the composite frequencies of the pendulums, and means for indicating the pulsations.

14. Apparatus for gravitational prospecting, which comprises two pendulum units, each unit comprising two pendulums mounted to oscillate about horizontal axes, the pendulums of each unit oscillating in planes perpendicular to each other, the individual pendulums of each unit being mounted to swing in the same vertical plane and being adapted to swing 180° out of phase, a plurality of mirrors one carried by the top of each pendulum, a source of a beam of light, means for deflecting the beam of light successively from a mirror of one unit to and successively from a mirror of the other unit whereby the beam describes a circular or elliptical path, means for breaking the path of the beam into increments, means for creating successive pulsations of electric energy corresponding to the increments, and means for indicating the pulsations.

15. Apparatus for gravitational prospecting, which comprises two pendulum units, each unit comprises two pendulums mounted to swing about horizontal axes, the pendulums of each unit oscillating in planes perpendicular to each other, the individual pendulums of each unit being mounted to swing in the same vertical plane and being adapted to swing 180° out of phase, a plurality of mirrors one carried by the top of each pendulum, a source of a beam of light, means for deflecting the beam of light successively from the mirrors of a pendulum of each unit whereby the beam describes a circular or elliptical path, a photo-electric cell, means for intermittently directing the beam of light upon the cell to actuate the cell to produce pulsations of electric energy corresponding to a multiple of the composite frequencies of the pendulums, and means for indicating the pulsations.

16. Apparatus for gravitational prospecting, which comprises two pendulum units, each unit comprising two pendulums mounted to swing about horizontal axes, the pendulums of each unit oscillating in planes perpendicular to each other, the individual pendulums of each unit being mounted to swing in the same vertical plane and being adapted to swing 180° out of phase, a plurality of mirrors one carried by the top of each pendulum, a source of a beam of light, means for deflecting the beam of light in succession from the mirrors of one unit and then in succession from the mirrors of the other unit whereby the beam describes a circular or elliptical path, means for breaking the path of the beam into increments, means for creating successive pulsations of electric energy corresponding to the increments, and means for indicating the pulsations.

17. Apparatus for gravitational prospecting, which comprises two pendulum units, each unit comprising two pendulums mounted to swing about horizontal axes, the pendulums of each unit oscillating in planes perpendicular to each other, the individual pendulums of each unit being mounted to swing in the same vertical plane and being adapted to swing 180° out of phase, a plurality of mirrors one carried by the top of each pendulum, a source of a beam of light, means for deflecting the beam of light in succession from the mirrors of one unit and then in succession from the mirrors of the other unit, whereby the beam describes a circular or elliptical path, a photo-electric cell, a scanning disc having radial slits and disposed in the circular path whereby the beam of light intermittently shines through the slits to actuate the cell to produce pulsations of electric energy corresponding to the composite frequencies of the pendulums, and means for indicating the pulsations.

18. Apparatus for gravitational prospecting, comprising pendulums mounted to oscillate about horizontal axes in planes perpendicular to each other, a mirror carried by the top of each pendulum, a photo-electric cell, a scanning disc having radial slits and disposed between the cell and the mirrors, a source of a beam of light, means for deflecting the beam of light successively from the mirrors whereby the beam describes an ellipse on the scanning disc around the axis of the slits, means for inclining the disc so that the beam of light traces a circle upon the disc and intermittently shines through the slits to actuate the cell to produce pulsations of electric energy corresponding to a multiple of the composite frequencies of the pendulums, and means for indicating the pulsations.

19. Apparatus for gravitational prospecting, comprising pendulous means mounted to swing, a source of a beam of light, means for reflecting the beam of light from the pendulous means in a circular or elliptical path, means for breaking the path of the beam into increments, and means for indicating the increments.

20. A pendulum comprising a horizontal plate, a point support resting upon the plate, and a hollow inertia member surrounding and depending from the support whereby the center of gravity of the member describes a curve in a horizontal plane.

21. Apparatus for gravitational prospecting, comprising pendulums mounted to oscillate about horizontal axes in planes perpendicular to each other, a source of a beam of light, means for deflecting the beam of light successively from the pendulums whereby the beam describes a circular or elliptical path, means for breaking the path of the beam into increments, and means for indicating the increments.

22. Apparatus for gravitational prospecting, comprising pendulums mounted to oscillate about horizontal axes in planes perpendicular to each other, means for directing and reflecting a beam of light toward said pendulums and thence in a circular or elliptical path, means for breaking the path of the beam into increments, and means for indicating the increments.

23. Apparatus for gravitational prospecting, comprising a pendulum system at a base station, a pendulum system at a field station, each system including a pendulum mounted for rotation about a vertical axis and means for creating successive pulsations of electric energy corresponding to increments of swing of the pendulum, means for amplifying the pulsations, synchronous motors, one driven by the pulsations from one system and the other driven by the pulsations of the other system, discs adapted to be driven in rotation in the same direction by the motors and mounted on a common axis, the discs having radially disposed slots, and means for observing the coincidences of the slots whereby variations in the frequencies of each system are observed.

24. Apparatus of the class described, comprising a member mounted for rotation about a vertical axis, a source of a beam of light, means for reflecting the beam of light from the member whereby the beam describes a circular or elliptical path, means for breaking the path of the beam into increments, and means for indicating the increments.

HAROLD A. WILSON.